United States Patent
Maeda

(10) Patent No.: US 10,200,552 B2
(45) Date of Patent: Feb. 5, 2019

(54) JOB PROCESSING APPARATUS, METHOD FOR CONTROLLING JOB PROCESSING APPARATUS, AND STORAGE MEDIUM

(71) Applicant: CANON KABUSHIKI KAISHA, Tokyo (JP)

(72) Inventor: Ryo Maeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/263,074

(22) Filed: Sep. 12, 2016

(65) Prior Publication Data

US 2017/0085730 A1 Mar. 23, 2017

(30) Foreign Application Priority Data

Sep. 17, 2015 (JP) ................. 2015-184525

(51) Int. Cl.
*H04N 1/00* (2006.01)
*H04N 1/44* (2006.01)
*G06F 3/12* (2006.01)

(52) U.S. Cl.
CPC ....... *H04N 1/00482* (2013.01); *G06F 3/1204* (2013.01); *G06F 3/1238* (2013.01); *G06F 3/1257* (2013.01); *G06F 3/1285* (2013.01); *H04N 1/0035* (2013.01); *H04N 1/00411* (2013.01); *H04N 1/00917* (2013.01); *H04N 1/4413* (2013.01); *H04N 2201/0094* (2013.01)

(58) Field of Classification Search
CPC ............. H04N 1/00482; H04N 1/0035; H04N 1/00411; H04N 1/00917; H04N 1/4413; H04N 2201/0094; G06F 3/1204; G06F 3/1238; G06F 3/1257; G06F 3/1285
See application file for complete search history.

(56) References Cited

U.S. PATENT DOCUMENTS

2014/0300927 A1* 10/2014 Kuroda ................ H04N 1/0097
358/1.15
2014/0355023 A1* 12/2014 Kojima ................ H04N 1/0097
358/1.13

FOREIGN PATENT DOCUMENTS

| CN | 101521715 A | 9/2009 |
|---|---|---|
| CN | 103139415 A | 6/2013 |
| CN | 104683638 A | 6/2015 |
| JP | 2010-122279 A | 6/2010 |

* cited by examiner

*Primary Examiner* — Iriana Cruz
(74) *Attorney, Agent, or Firm* — Canon U.S.A., Inc. IP Division

(57) ABSTRACT

According to the fact that a user logs out and then logs in again, a selection screen is displayed. Based on the fact that a selection is made through the selection screen to set, as setting information of a job, setting information stored in association with identification information of the user having logged in again, the setting information stored in association with the identification information of the user is set as setting information of the job.

12 Claims, 13 Drawing Sheets

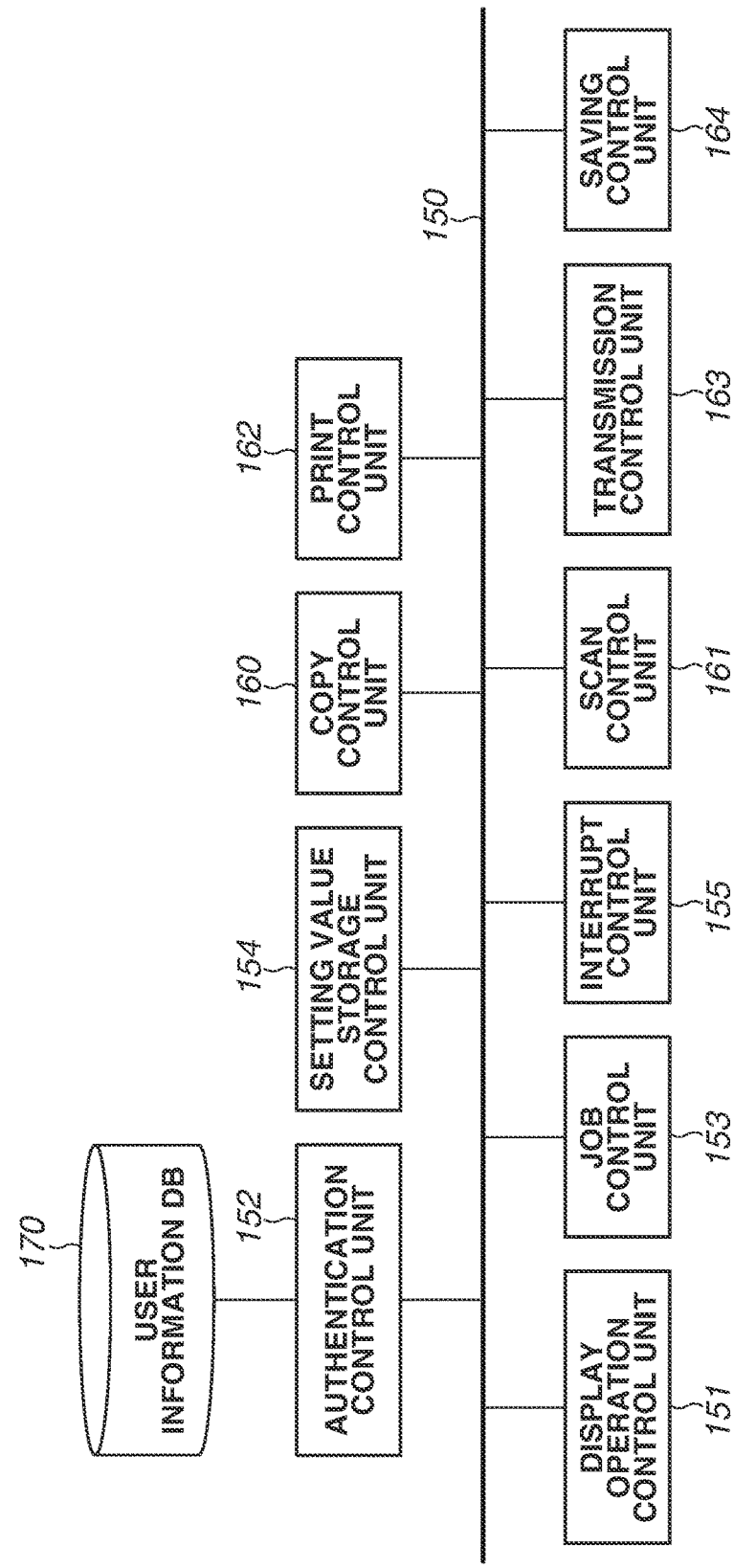

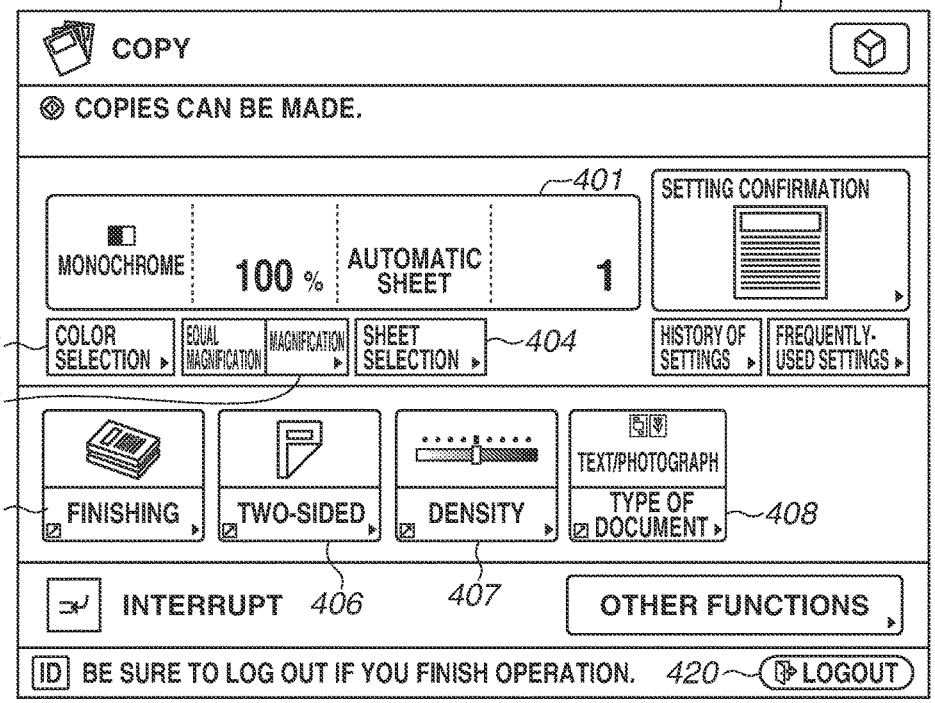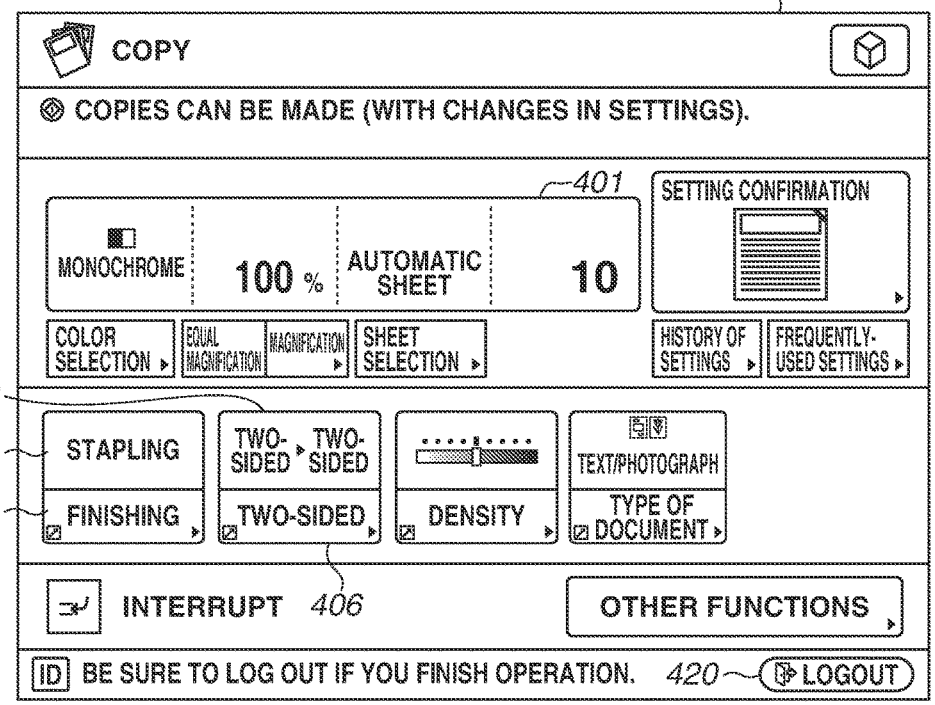

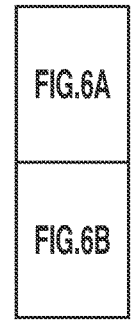
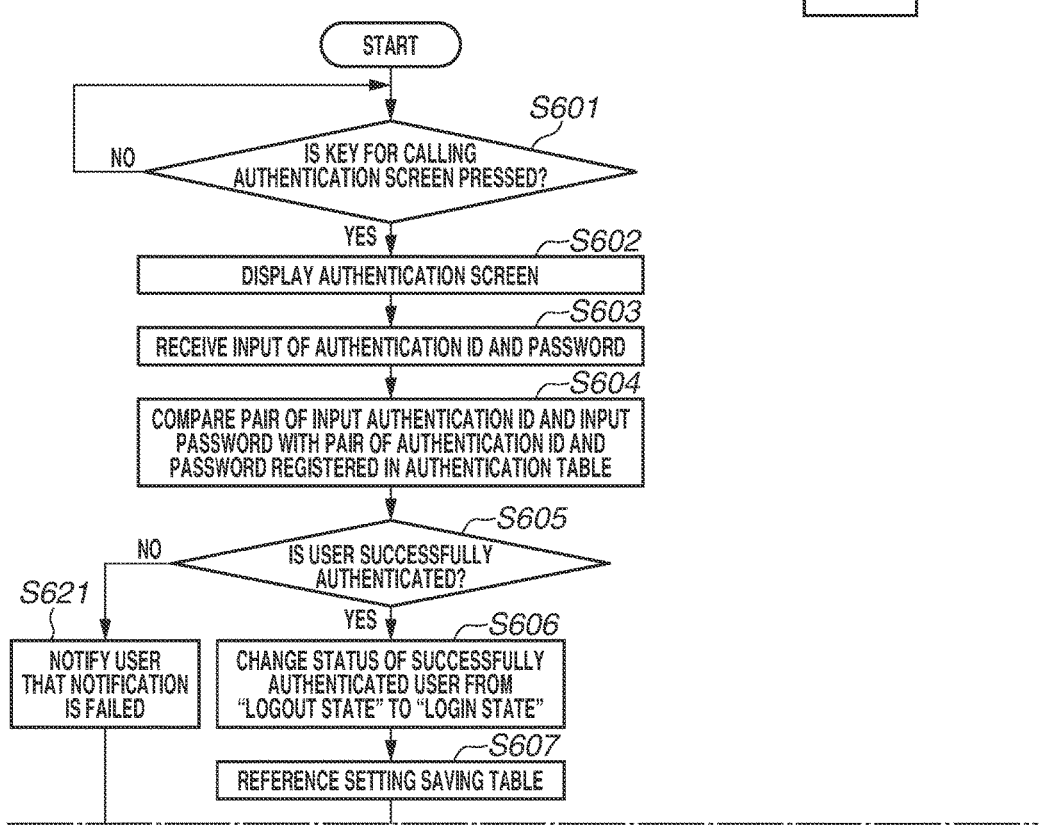
FIG.6A

FIG.7

| AUTHENTICATION ID | JOB SETTINGS | RESTORATION CONFIRMATION FLAG | SAVING CONFIRMATION FLAG |
|---|---|---|---|
| 00000001 | 2 COPIES, COLOR, 100%, MANUAL-BYPASS TRAY, STANDARD DENSITY, PRINTED PHOTOGRAPH, ... | TRUE | TRUE |
| 00000002 | 10 COPIES, MONOCHROME, 100%, AUTOMATIC SHEET, STAPLING, TWO-SIDED → TWO-SIDED, STANDARD DENSITY, TEXT/PHOTOGRAPH, ... | FALSE | FALSE |
| ... | ... | ... | ... |
| 00010001 | NULL | ... | ... |
| 00010002 | 1 COPY, MONOCHROME, 141%, CASSETTE 2: A3, STANDARD DENSITY, TEXT/PHOTOGRAPH, ... | TRUE | TRUE |
| ... | ... | TRUE | FALSE |
| 12345678 | NULL | FALSE | FALSE |
| ... | ... | ... | ... |

701 702 703 704

700

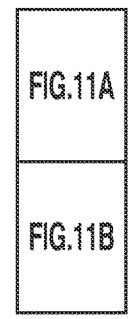
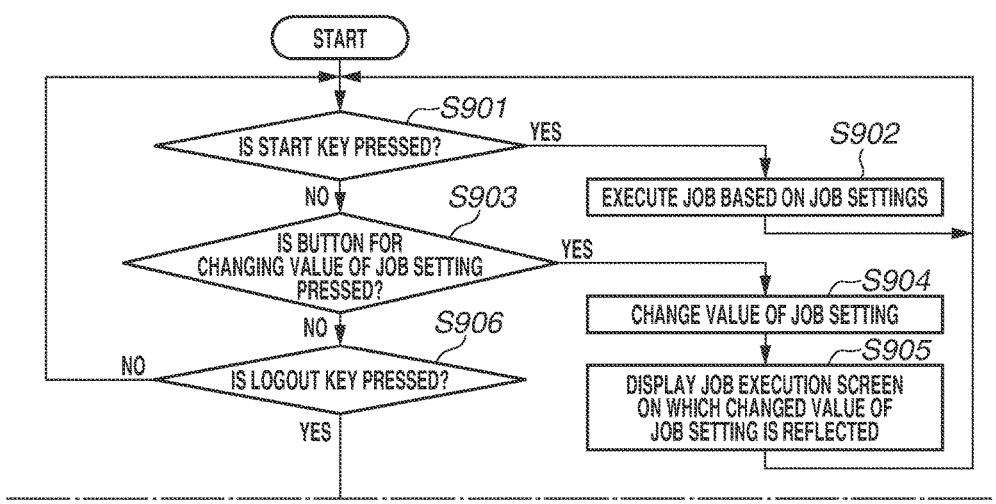
FIG.11A

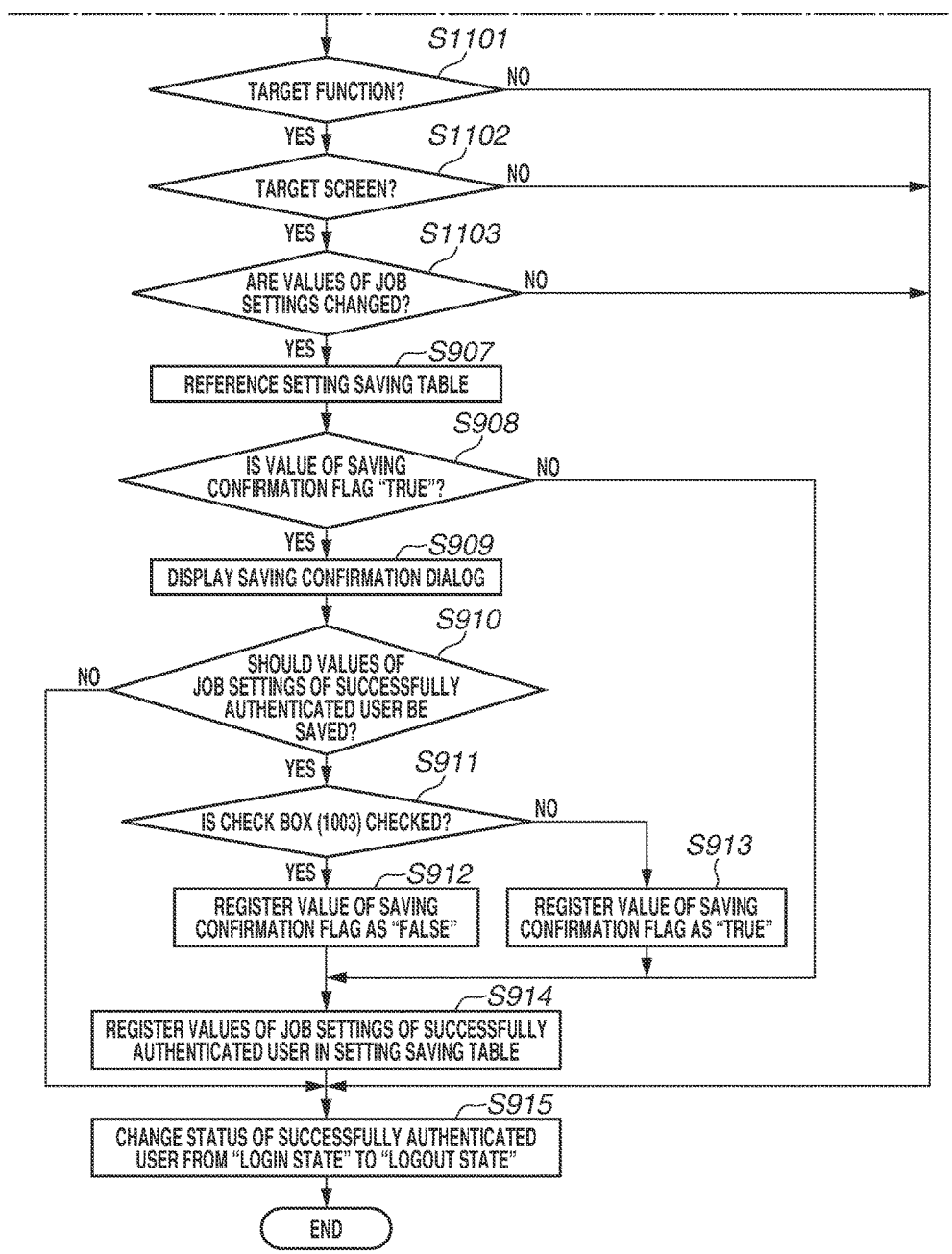

JOB PROCESSING APPARATUS, METHOD FOR CONTROLLING JOB PROCESSING APPARATUS, AND STORAGE MEDIUM

BACKGROUND OF THE INVENTION

Field of the Invention

The present invention relates to a job processing apparatus, a method for controlling a job processing apparatus, and a storage medium.

Description of the Related Art

There is the following image forming apparatus. When a user having the right of prior use over a user that has logged in logs into an image forming apparatus later, the image forming apparatus stores, in a setting storage unit, information of print settings that the user having logged into the image forming apparatus earlier has made in the image forming apparatus. Then, when the authentication state of the user having the right of prior use changes from a login state to a logout state, then based on the information of the print settings stored in the setting storage unit, the image forming apparatus displays a screen obtained by reproducing the state where the user having logged into the image forming apparatus earlier has made the print settings (see Japanese Patent Application Laid-Open No. 2010-122279).

Suppose that a user having logged in a job processing apparatus needs to leave the job processing apparatus while setting a job. In this case, the user logs out of the job processing apparatus. In the case of such a user, it is desirable that when the user logs into the job processing apparatus again, the user should take over the settings of the job that the user has made at the time of the previous login, and continue to set the job. On the other hand, suppose that after a user having logged in a job processing apparatus sets a job, the need to execute the job is eliminated. In this case, the user logs out of the job processing apparatus. In the case of such a user, it is desirable that when the user logs into the job processing apparatus again, the user should set a job from the beginning without taking over the settings of the job that the user has made at the time of the previous login.

SUMMARY OF THE INVENTION

The present invention is directed to providing an apparatus and a method for allowing a user to, through a screen displayed according to the fact that the user logs in again, select whether to set setting information of a job received from the user at the time of the previous login, as setting information of the job when the user logs in again.

According to an aspect of the present invention, a job processing apparatus includes a login unit configured to cause a user to log into the job processing apparatus, a logout unit configured to cause a user to log out of the job processing apparatus, a storage unit configured to store setting information of a job received from a user having logged in the job processing apparatus, in association with identification information of the user, a display unit configured to, according to a fact that the user logs out of the job processing apparatus and then logs into the job processing apparatus again, display a selection screen for allowing the user to select whether to set as setting information of the job the setting information stored in the storage unit in association with the identification information of the user, a setting unit configured to, based on a fact that a selection is made through the selection screen to set as setting information of the job the setting information stored in the storage unit in association with the identification information of the user having logged into the job processing apparatus again, set as setting information of the job the setting information stored in the storage unit in association with the identification information of the user having logged into the job processing apparatus again, and based on a fact that a selection is made through the selection screen so as not to set as setting information of the job the setting information stored in the storage unit in association with the identification information of the user having logged into the job processing apparatus again, set default setting information as setting information of the job, and an execution unit configured to execute the job based on the setting information of the job set by the setting unit.

Further features of the present invention will become apparent from the following description of exemplary embodiments with reference to the attached drawings.

BRIEF DESCRIPTION OF THE DRAWINGS

FIG. 3 is a block diagram illustrating configurations of software modules of the MFP according to the present exemplary embodiment.

FIGS. 4A and 4B are diagrams illustrating configurations of screens according to a first exemplary embodiment.

FIG. 7 is a schematic diagram illustrating a table according to the first exemplary embodiment.

FIG. 11 (FIGS. 11A and 11B) is a flowchart illustrating an example of control according to a second exemplary embodiment.

DESCRIPTION OF THE EMBODIMENTS

Exemplary embodiments of the present invention will be described in detail below with reference to the accompanying drawings. The following exemplary embodiments do not limit the present invention according to the appended claims, and not all the combinations of the features described in the exemplary embodiments are essential for a method for solving the problems in the present invention.

In a first exemplary embodiment, setting information of a job received from a user having logged into a job processing apparatus is stored in a storage unit in association with identification information of the user. Then, according to the fact that the user logs out of the job processing apparatus and then logs into the job processing apparatus again, a selection screen for allowing the user to select whether to set as setting information of the job the setting information stored in the storage unit in association with the identification information of the user is displayed. Based on the fact that a selection is made through the selection screen to set as setting information of the job the setting information stored in association with the identification information of the user having logged into the job processing apparatus again, the setting information stored in association with the identification information of the user is set as setting information of the job. On the other hand, based on the fact that a selection is made through the selection screen so as not to set as setting information of the job the setting information stored in the storage unit in association with the identification information of the user having logged into the job processing apparatus again, default setting information is set as setting information of the job. The details are described below.

Figure 1:
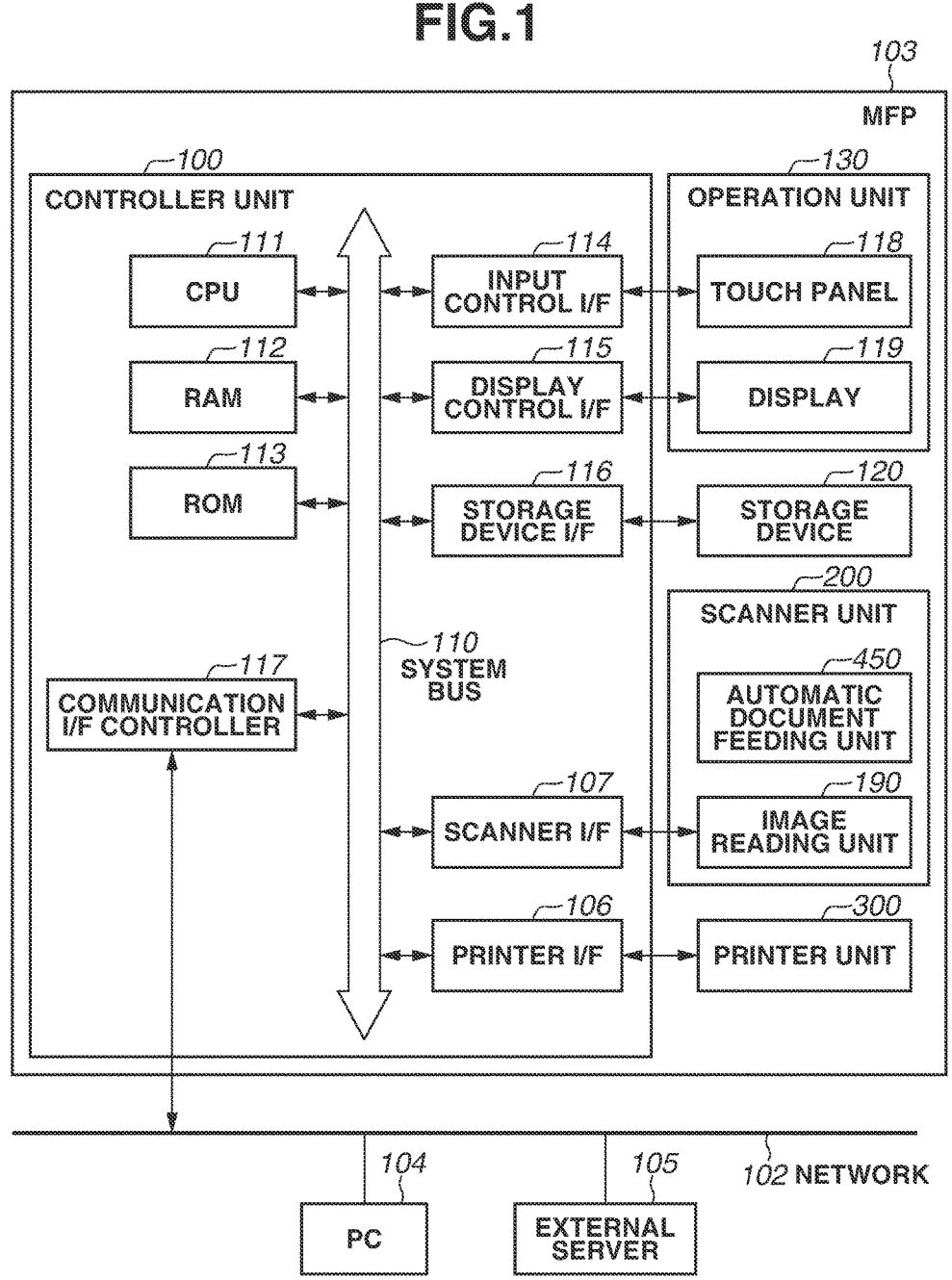
FIG. 1 is a block diagram illustrating a hardware configuration of a multifunction peripheral (MFP) according to the present exemplary embodiment.

With reference to a block diagram in FIG. 1, a description is given of the hardware configuration of a multifunction peripheral (MFP) 103, which is an example of the job processing apparatus according to the first exemplary embodiment of the present invention.

The MFP 103 has a copy function for reading a document to generate image data and printing an image on a sheet based on the generated image data. The MFP 103 also has a PC print function for receiving a print job from an external apparatus such as a personal computer (PC) 104 or an external server 105 and printing a character and an image on a sheet based on data for which a print instruction is received. The printing performed by each print function may be color printing or monochrome printing.

For example, the PC 104 generates image data using application software and transmits the generated image data to the MFP 103. Further, for example, the PC 104 generates page description language (PDL) data using a printer driver. Then, a controller unit 100 of the MFP 103 rasterizes the PDL data sent from the PC 104 via a network 102, thereby generating bitmap data.

The controller unit 100 is connected to an external apparatus such as the PC 104 or the external server 105 via the network 102 and performs the process of receiving a job from the external apparatus. The network 102 may be a local area network (LAN) or a wide area network (WAN) such as the Internet.

FIG. 1 illustrates an example of the configuration in which a single PC 104 is connected to the MFP 103 via the network 102. The present invention, however, is not limited to this. Alternatively, the configuration may be such that a plurality of PCs 104 is connected to the MFP 103 via the network 102. Further, FIG. 1 illustrates an example of the configuration in which a single external server 105 is connected to the MFP 103 via the network 102. The present invention, however, is not limited to this. Alternatively, the configuration may be such that a plurality of external servers 105 is connected to the MFP 103 via the network 102.

The controller unit 100 of the MFP 103 is connected to a scanner unit 200, which is an image input device, and a printer unit 300, which is an image output device. The controller unit 100 controls the input and output of image information. The scanner unit 200 includes an automatic document feeding unit 450 and an image reading unit 190, which will be described below with reference to FIG. 2. The automatic document feeding unit 450 conveys documents stacked in a document tray. The image reading unit 190 reads an image of each document using an optical sensor such as a charge-coupled device (CCD) sensor. Then, the image reading unit 190 transfers image data generated by reading the image of the document to the controller unit 100.

The printer unit 300 prints an image on a sheet based on image data input from the scanner unit 200, the PC 104, or the external server 105.

The controller unit 100 is connected to an operation unit 130, which corresponds to an example of a user interface unit. The operation unit 130 includes a touch panel 118 and a display 119. The operation unit 130 has the function of providing information for a user through the display 119. The display 119 is a liquid crystal display (LCD: a liquid crystal display unit) and displays an operation screen and the state of the MFP 103. The touch panel 118 refers to a touch panel sheet attached to the LCD. The operation unit 130 has the function (also referred to as a "software key") of receiving various settings and inputs from the user through the touch panel 118. The operation unit 130 displays on the display 119, for example, a start key, which is used to give an instruction to start the execution of scanning or copying, and a stop key, which is used to give an instruction to stop the operation of scanning or copying. Further, the display 119 displays an authentication key, which is used to display on the display 119 an authentication screen for authenticating the user, a numeric keypad, which is used to input any number, and a logout key, which is used by the user to log out of the MFP 103. Then, the operation unit 130 receives the selection of these keys through the touch panel 118. An example has been described where various settings and inputs are received from the user through the touch panel 118. The present invention, however, is not limited to this. Alternatively, the operation unit 130 may include a physical key (also referred to as a "hardware key") and receive various settings and inputs from the user through the physical key.

The controller unit 100 is connected to a storage device 120. The storage device 120 is, for example, a hard disk drive (HDD) or a solid-state drive (SSD).

The storage device 120 mainly stores information (system software) necessary to cause a computer to start and operate, and image data. Further, the storage device 120 stores software modules to be executed by a central processing unit (CPU) 111 and described below with reference to FIG. 3.

Further, the storage device 120 stores various control programs to be executed by the CPU 111 and required to perform various types of processing of flowcharts described below with reference to FIG. 6 (FIGS. 6A and 6B), 9, and 11 (FIGS. 11A and 11B). The storage device 120 also stores a display control program for displaying various screens on the display 119 and a program for executing rasterization. The CPU 111 reads a program stored in the storage device 120 and loads the read program into a random-access memory (RAM) 112, thereby performing various operations according to the present exemplary embodiment.

Further, for example, the storage device 120 stores a user information database (DB) in which user information such as a user identifier, a user name, and a password is managed with respect to each user. The user information DB will be described below with reference to FIG. 3. Further, for example, the storage device 120 stores a setting saving table in which user information such as an authentication identification (ID), job settings, a restoration confirmation flag, and a saving confirmation flag is managed with respect to each user. The setting saving table will be described below with reference to FIG. 7.

The controller unit 100 includes the CPU 111, the RAM 112, a read-only memory (ROM) 113, and a communication interface (I/F) controller 117. The controller unit 100 also includes an input control I/F 114, a display control I/F 115, a storage device I/F 116, a printer I/F 106, and a scanner I/F 107. These modules are connected to each other via a system bus 110.

Based on a control program stored in the ROM 113, the CPU 111 performs overall control of the MFP 103. The CPU 111 reads a control program stored in the ROM 113 and executes various types of control processing such as the control of reading by the scanner unit 200, the control of printing by the printer unit 300, and the control of the update of firmware.

The RAM 112 is a readable and writable memory. The RAM 112 is also a system work memory for the operation of the CPU 111. Further, the RAM 112 is used as a temporary storage area for image data input from the scanner unit 200, the PC 104, or the external server 105. The RAM 112 is also used as a storage area for temporarily storing setting information of a job received from the user through the touch panel 118.

The ROM 113 is a read-only memory. The ROM 113 is also a boot ROM. The ROM 113 stores a boot program for the system in advance.

The software modules to be executed by the CPU 111 and described below with reference to FIG. 3 may be stored not in the storage device 120 but in the ROM 113. The various control programs to be executed by the CPU 111 and required to perform the various types of processing of the flowcharts described below with reference to FIG. 6 (FIGS. 6A and 6B), 9, and 11 (FIGS. 11A and 11B) may be stored not in the storage device 120 but in the ROM 113. The display control program for displaying various screens on the display 119 and the program for executing rasterization may be stored not in the storage device 120 but in the ROM 113. In this case, the CPU 111 reads a program stored in the ROM 113 and loads the read program into the RAM 112, thereby performing various operations according to the present exemplary embodiment.

The storage device I/F 116 is an interface for connecting the storage device 120 and the controller unit 100. The storage device I/F 116 transmits, from the controller unit 100 to the storage device 120, data written in the storage device 120. Further, the storage device I/F 116 transmits, to the controller unit 100, data read from the storage device 120.

The communication I/F controller 117 connects the controller unit 100 to the network 102. For example, the communication I/F controller 117 transmits image data and various pieces of information (e.g., setting information of a job received from the user through the touch panel 118) to the PC 104 or the external server 105. Further, for example, the communication I/F controller 117 receives update firmware and various pieces of information from the PC 104 or the external server 105.

The input control I/F 114 is an interface for connecting the touch panel 118 and the controller unit 100. The input control I/F 114 transmits, to the CPU 111, information input by the user through the touch panel 118.

The display control I/F 115 is an interface for connecting the display 119 and the controller unit 100. The display control I/F 115 outputs, from the controller unit 100 to the display 119, image data to be displayed on the display 119.

The scanner I/F 107 is an interface for connecting the scanner unit 200 and the control unit 100. The scanner I/F 107 outputs, from the scanner unit 200 to the controller unit 100, image data acquired by the image reading unit 190.

The printer I/F 106 is an interface for connecting the printer 300 and the control unit 100. The printer I/F 106 transfers, from the controller unit 100 to the printer unit 300, image data to be printed by the printer unit 300.

Figure 2:
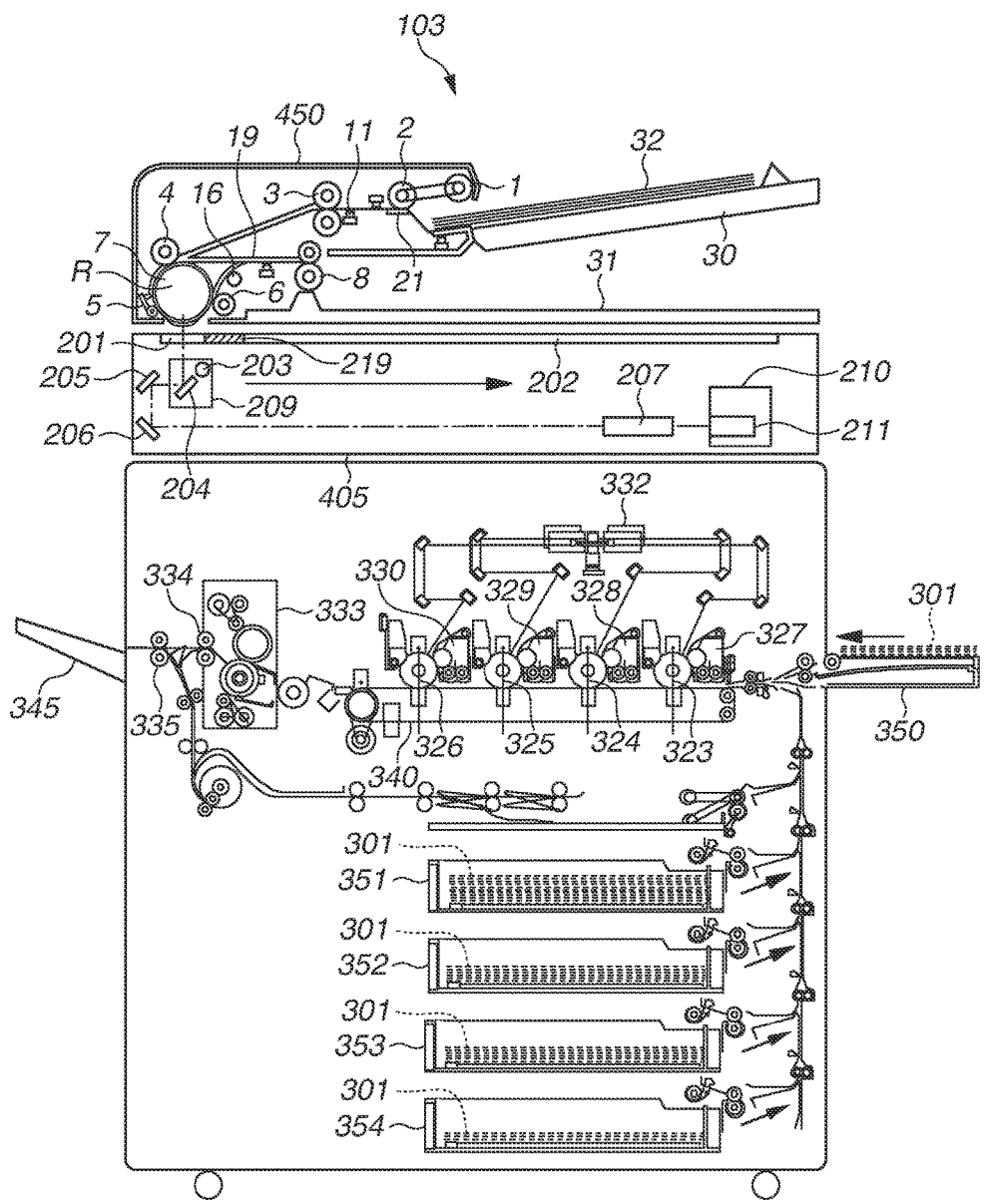
FIG. 2 is a cross-sectional view illustrating a configuration of the MFP according to the present exemplary embodiment.

Next, with reference to a cross-sectional view in FIG. 2, the operations of the scanner unit 200 and the printer unit 300 are described.

First, with reference to the cross-sectional view in FIG. 2, the operation of the scanner unit 200 is described.

The scanner unit 200 includes the automatic document feeding unit 450. The automatic document feeding unit 450 includes a document tray 30 for stacking documents and feeds each of the documents 32 placed on the document tray 30. Then, the scanner unit 200 reads an image of the fed document 32 at the position of a fixed optical system. This operation is specifically described below.

The automatic document feeding unit 450 includes the document tray 30, in which a bundle of documents including one or more documents 32 is stacked, a separation pad 21, which prevents the bundle of documents from protruding from the document tray 30 to advance downstream before the conveyance of the documents 32 is started, and a feed roller 1.

The feed roller 1 falls on the document surface of the bundle of documents stacked in the document tray 30 and rotates. Consequently, the document 32 on the top surface of the bundle of documents is fed. The plurality of documents 32 fed by the feed roller 1 is separated and fed one by one by the actions of a separation roller 2 and the separation pad 21. This separation is achieved by a known retard separation technique.

Each of the documents 32 separated by the separation roller 2 and the separation pad 21 is conveyed to a registration roller 4 by a pair of conveying rollers 3. Then, the conveyed document 32 is hit against the registration roller 4. This removes the skew of the conveyance of the document 32. Downstream of the registration roller 4, a feeding path for conveying in the direction of skimming-through glass 201 the document 32 having passed through the registration roller 4 is placed.

The document 32 sent to the feeding path is sent onto a platen by a large roller 7 and a feed roller 5. At this time, the large roller 7 comes into contact with the skimming-through glass 201. Then, the scanner unit 200 reads an image of the front surface of the document 32 passing through the skimming-through glass 201. The document 32 fed by the large roller 7 passes through a conveying roller 6 and moves between a roller 16 and a discharge flapper. Then, the document 32 is discharged to a document discharge tray 31 through the discharge flapper and discharge rollers 8.

The scanner unit 200 can read an image of the back surface of the document 32 by reversing the document 32. Specifically, in the state where the document 32 is inserted between the discharge rollers 8, the discharge rollers 8 are rotated backward to switch the discharge flapper, thereby moving the document 32 to a reverse path 19. The moved document 32 is hit against the registration roller 4 from the reverse path 19, thereby removing the skew of the conveyance of the document 32 again. Then, the document 32 is moved to the skimming-through glass 201 again by the feed roller 5 and the large roller 7. Then, the scanner unit 200 reads an image of the back surface of the document 32 passing through the skimming-through glass 201.

On the other hand, to read a document placed on the document platen glass 202 by the user, the scanner unit 200 causes an optical scanner unit 209 to scan the document placed on the document platen glass 202 in a sub-scanning direction indicated by an arrow in FIG. 2. Consequently, the scanner unit 200 optically reads image information recorded on the document.

The document 32 on the document tray 30 or the document on the document platen glass 202 is read by the following optical system. This optical system includes the skimming-through glass 201, the document platen glass 202, the optical scanner unit 209, which includes an optical lamp 203 and a mirror 204, mirrors 205 and 206, a lens 207, and a CCD sensor unit 210. In the present exemplary embodiment, the CCD sensor unit 210 includes a CCD 211 (a CCD (a 3-line sensor unit) for reading a color image (red, green, and blue (RGB)) and a CCD (a 1-line sensor unit) for reading a monochrome image).

The image information read by the optical system is photoelectrically converted and input as image data to the controller unit 100. In the present exemplary embodiment, a case has been described where the optical system included in the scanner unit 200 is a reduction optical system, which forms an image of reflected light from the document 32 on a CCD sensor. The present invention, however, is not limited to this. Alternatively, the optical system included in the scanner unit 200 may be an equal-magnification optical system, which forms an image of reflected light from the document 32 on a contact image sensor (CIS).

Next, with reference to the cross-sectional view in FIG. 2, the operation of the printer unit 300 is described.

The printer unit 300 performs the operation of outputting an image onto a sheet 301 based on image data transferred to the printer unit 300 (a printing operation). This operation is specifically described below.

Image data transferred to the printer unit 300 is converted into laser light according to the image data by a laser unit 332. Then, photosensitive drums (323 to 326) are irradiated with the laser light, thereby forming electrostatic latent images according to the image data on the photosensitive drums (323 to 326). Then, the latent images formed on the photosensitive drums (323 to 326) are developed using toner (developers) by developing units (327 to 330), thereby resulting in visualized toner images. A color printer includes four photosensitive drums (323 to 326) and four developing units (327 to 330) for cyan, yellow, magenta, and black.

Further, the printer unit 300 includes cassettes (351 to 354) and a manual-bypass tray 350 as a sheet holding unit (also referred to as a "sheet feeding stage"). The cassettes (351 to 354) can hold a plurality of (e.g., 600) sheets 301. On the other hand, the manual-bypass tray 350 can hold a plurality of (e.g., 100) sheets 301. The printer unit 300 transfers the toner images developed and visualized using the toner onto a sheet 301 fed from any one of the cassettes (351 to 354) and the manual-bypass tray 350. Then, the printer unit 300 conveys to a fixing unit 333 the sheet 301 onto which the toner is transferred. Then, the printer unit 300 fixes the toner to the sheet 301 by heat and pressure. The sheet 301 having passed through the fixing unit 333 is discharged to a discharge tray 345 (a discharge unit) included in the MFP 103 by conveying rollers 334 and 335.

A case has been described where the MFP 103 is a color printer including four photosensitive drums (323 to 326) and four developing units (327 to 330). The present invention, however, is not limited to this. Alternatively, the present invention can also be similarly applied to the MFP 103 that is a monochrome printer including a single photosensitive drum 326 and a single developing unit 330.

A description has been given of a method for printing an image on the sheet 301 by an electrophotographic method. The present invention, however, is not limited to this. Alternatively, the present invention can also be similarly applied to a method for printing an image on the sheet 301 using an ink-jet method or another method (e.g., a thermal transfer method) so long as the method can print an image on the sheet 301.

Next, with reference to a block diagram in FIG. 3, the configurations of software modules of the MFP 103 according to the first exemplary embodiment are described.

The MFP 103 includes, as the software modules, control units for respective functions. These software modules are stored in the storage device 120 or the ROM 113.

For example, the control units include a display operation control unit 151, an authentication control unit 152, a job control unit 153, a setting value storage control unit 154, and an interrupt control unit 155. For example, the control units also include a transmission control unit 163, which controls the transmission of image data and various pieces of information via the network 102, and a saving control unit 164, which controls the writing of data to the storage device 120. For example, the control units also include a copy control unit 160, which controls a copy operation, a scan control unit 161, which controls a scan operation, and a print control unit 162, which controls a print operation. These control units are achieved by the CPU 111 executing a program stored in the storage device 120 or the ROM 113.

Specifically, when the MFP 103 is started, or when a copy, fax, scan transmission, or print function (hereinafter referred to as a "function") is used, the CPU 111 loads a program stored in the storage device 120 or the ROM 113 into the RAM 112. Then, according to the fact that processing is started by the control unit for each function, the CPU 111 issues a job. Then, the job issued by the CPU 111 is managed by the job control unit 153.

A "job" refers to a series of processes executed by each of scan, transmission, copy, and print functions. For example, a "copy job" performs a series of processes for, based on image data acquired by reading an image of the document 32 via the scanner unit 200, printing an image on the sheet 301 via the printer unit 300. Further, for example, a "print job" performs a series of processes for, based on image data received from an external apparatus such as the PC 104 or the external server 105 or image data stored in the storage device 120, printing an image on the sheet 301 via the printer unit 300. Further, for example, a "scan transmission job" performs a series of processes for transmitting, to an external apparatus by electronic mail, image data acquired by reading an image of the document 32 via the scanner unit 200. The process of reading an image of the document 32 via the scanner unit 200 may be referred to as a "scan job", and the process of transmitting, to an external apparatus by fax or electronic mail, image data acquired by reading an image of the document 32 may be referred to as a "transmission job".

Each function is called through a main screen displayed on the display 119. The main screen is displayed on the display 119 according to the fact that a key for transitioning from a job execution screen for each function to the main screen is pressed by the user.

On this main screen, for example, buttons for calling various functions such as a copy function, a fax function, a scan transmission function, and a print function are displayed. Then, if any one of the buttons on the main screen displayed on the display 119 is pressed by the user, one of the various functions such as the copy function, the fax function, the scan transmission function, and the print function is called.

At this time, a screen for using the called function is displayed on the display 119. For example, if the copy function is selected by the user, a job execution screen for using the copy function is displayed on the display 119. For example, if the fax function is selected by the user, a job execution screen for using the fax function is displayed on the display 119. For example, if the scan transmission function is selected by the user, a job execution screen for transmitting, to any destination by email, image data generated by reading an image of a document is displayed on the display 119. Further, for example, if the print function is selected by the user, a job execution screen for executing printing (a print job) based on image data received from an external apparatus such as the PC 104 or the external server 105 is displayed on the display 119.

With reference to FIGS. 4A and 4B, the job execution screen for using the copy function is described.

FIG. 4A is a copy execution screen 400 on which default copy job settings are reflected. The values of default job settings are reflected by, for example, importing Extensible Markup Language (XML) data describing the values of the default job settings. The default job settings may be device settings, group settings, or individual settings. This XML data is stored in the storage device 120.

For example, the user can optionally set the number of copies 401 (e.g., "1", "5", or "10") through the numeric keypad. Further, for example, the user presses a color selection button 402 on the copy execution screen 400 and thereby can select a color to be output (e.g., "full-color", "monochrome", or "unicolor"). Further, for example, the user presses a magnification button 403 on the copy execution screen 400 and thereby can set the magnification (e.g., "equal magnification (100%)", "70%", "141%", or "automatic"). Further, for example, the user presses a sheet selection button 404 on the copy execution screen 400 and thereby can select the sheet feeding source of sheets to be used for printing (e.g., "automatic", "cassette 1: A4", "cassette 2: A3", or "manual-bypass tray").

For example, the user presses a finishing button 405 on the copy execution screen 400 and thereby can select the type of finishing (e.g., "sorting (with respect to each copy)", "group (with respect to each page)", "stapling", or "shifting"). Further, for example, the user presses a two-sided copying button 406 on the copy execution screen 400 and thereby can select the type of two-sided copying (e.g., "one-sided→two-sided", "two-sided→two-sided", "two-sided→one-sided", or "double-page→two-sided"). Further, for example, the user presses a density adjustment button 407 on the copy execution screen 400 and thereby can adjust the printing density. Further, for example, the user presses a document type button 408 on the copy execution screen 400 and thereby can select the type of a document to be read by the scanner unit 200 (e.g., "text/photograph", "map", "printed photograph", "photographic paper photograph", or "text").

FIG. 4B is a copy execution screen 410 on which copy job settings changed from the default copy job settings are reflected. In an example of FIG. 4B, as the copy job settings, the type of finishing is changed to "stapling", and the type of two-sided copying is changed to "two-sided→two-sided".

Based on the control of CPU 111, the display operation control unit 151 controls the input control I/F 114 and the display control I/F 115. For example, based on an instruction from another control unit, the display operation control unit 151 performs display on the display 119 via the display control I/F 115. Further, for example, based on an instruction from another control unit, the display operation control unit 151 acquires, via the input control I/F 114, information input by the user through the touch panel 118. Then, the display operation control unit 151 notifies each control unit, via the control bus 150 where necessary, of information and data acquired via the input control I/F 114.

The authentication control unit 152 has the functions of registering or deleting user information, and updating user information. Based on the control of the CPU 111, the authentication control unit 152 performs an authentication process for identifying a user. Then, based on whether information of a user subjected to an authentication process through the authentication screen matches information of a user stored in a user information DB 170, the authentication control unit 152 determines whether the operator of the MFP 103 is a proper user having operation authority. The user information DB 170 is a database in which information of a user including an identifier (hereinafter referred to as a "user identifier") for uniquely specifying the user is stored. The user information DB 170 is stored in the storage device 120.

In the present exemplary embodiment, the process in which a user subjected to an authentication process by the authentication control unit 152 and determined as a proper user having operation authority starts a session such that the MFP 103 can be operated is referred to as a "login". On the other hand, the process in which the user determined as a proper user having operation authority ends the session is referred to as a "logout".

The authentication control unit 152 may have the functions of registering or deleting group information, and updating group information. In this case, in the user information DB 170, an identifier (hereinafter referred to as a "group identifier") for uniquely specifying a group of a user is stored. Then, based on whether information of a user subjected to an authentication process belongs to a group stored in the user information DB 170, the authentication control unit 152 may determine whether the operator of the MFP 103 is a proper user having operation authority. In a variation, the authentication control unit 152 may perform an authentication process by connecting to the external server 105 (an authentication server) via the communication I/F controller 117 and using the authentication result of the external server 105.

The setting value storage control unit 154 is a control unit for, based on the control of the CPU 111, storing device settings, individual settings, and group settings. The device settings are settings referenced by all the users. The group settings are settings that can be referenced by only users belonging to each group. For example, if the display language in the device settings is set to "Japanese", the environment for all the users is displayed in "Japanese". Further, for example, if the display language in the individual settings is set to "English", the environment for only a target user is displayed in "English". Further, for example, if the display language in the group settings is set to "Chinese", the environment for only users belonging to a target group is displayed in "Chinese".

The setting value storage control unit 154 can store, in addition to the display language setting, accessibility settings such as a screen color reversal setting, a key repeat speed setting, a brightness/luminance setting, and a sound volume setting, and settings for controlling a job of each function (referred to as "job settings"). In the case of the copy function, for example, the setting value storage control unit 154 can store a color, finishing, two-sided copying, and a density as the job settings. Further, in the case of the scan transmission function the setting value storage control unit 154 can store, for example, a color mode, a resolution, a file format, a transmission destination, a protocol, and a file name as the job settings.

When a user logs into the MFP 103, the setting value storage control unit 154 reads individual setting values (or device setting values) from the storage device 120 and reflects the read setting values on various settings of the MFP 103. This enables the user having logged into the MFP 103 to use the MFP 103 in the state where the individual setting values (or the device setting values) are reflected.

Setting values stored in the storage device 120 may be device setting values, individual setting values, or group setting values, or may be the combination of any of these. Further, these setting values may be stored in the external server 105, and these setting value may be received from the external server 105. The job control unit 153 manages information of a job issued by the CPU 111 (i.e., information of a job to be executed according to an instruction given by each function). For example, the job control unit 153 stores an identifier for uniquely identifying the job, a user identifier (an authentication ID) of the owner of the job, information indicating the type of the job, and information indicating the status (the state or the progress state) of the job, in the storage device 120 in association with each other.

The job control unit 153 further manages which resource is to be used by each function. Then, the job control unit 153 determines which hardware resource is being used by a currently executed job. While a user (a user A) having logged into the MFP 103 is executing a scan job or a print job, and even when a user (a user B) different from the user A logs into the MFP 103 to use the MFP 103, the job of the user A continues to operate in the background. Thus, the user B cannot execute an operation (i.e., a function) using the hardware resource that is being used by the job of the user A.

In response, the interrupt control unit 155 manages information of a job that is being executed in the background. The storage device 120 stores, as information of a job that is being executed in the background, for example, a job identifier, a user identifier of the owner of the job, information regarding whether the job is being executed in the background, and information regarding whether an error occurs in the job.

Next, an example of the authentication screen displayed on the display 119 is described. For example, according to the fact that a key (hereinafter referred to as an "authentication key") for calling the authentication screen is pressed, the authentication screen is displayed on the display 119. The authentication key may be a software key or a hardware key. On the authentication screen, a form for receiving the input of an authentication ID from a user, a form for receiving the input of a password from the user, and a login button are displayed.

Figure 5:
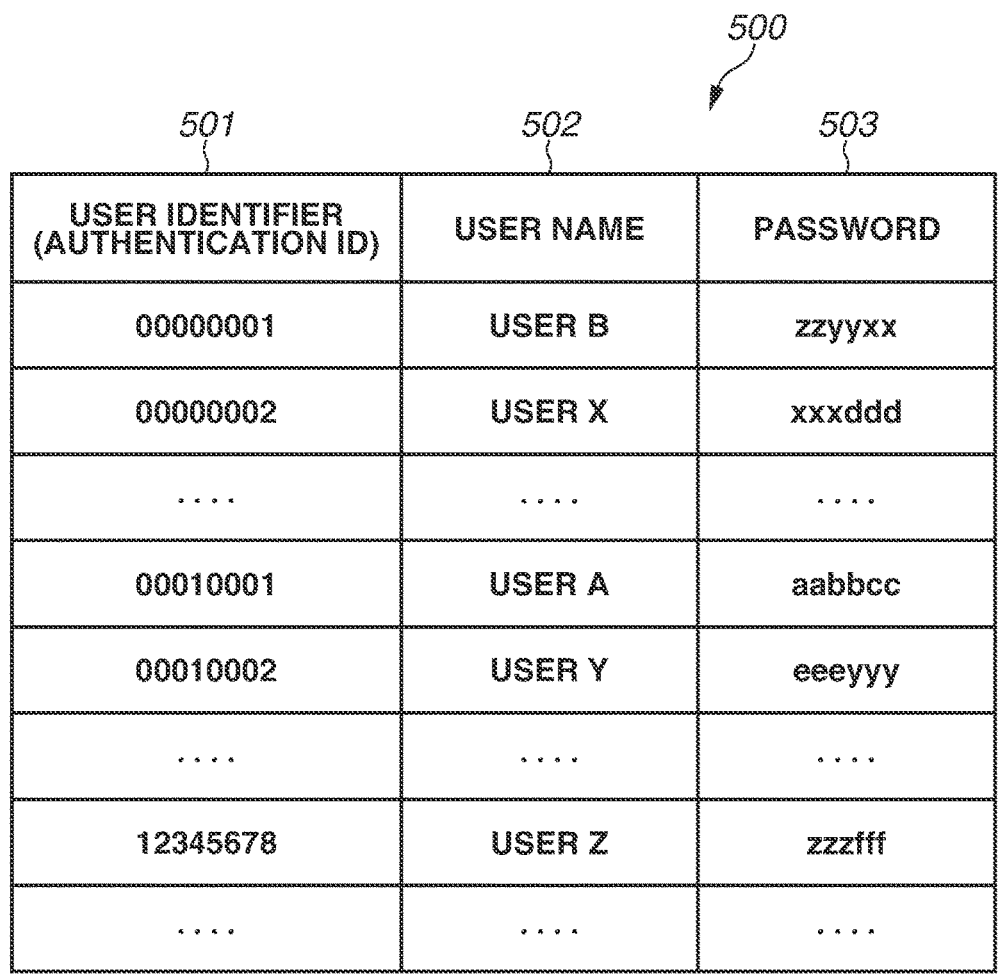
FIG. 5 is a schematic diagram illustrating a table according to the first exemplary embodiment.

Next, a description is given of an authentication table 500 as illustrated in FIG. 5, in which a user identifier (authentication ID) 501, a user name 502, and a password 503 are registered with respect to each user. The authentication table 500 is stored in the storage device 120.

A user inputs an authentication ID and a password to the forms on the authentication screen and then presses the login button. Then, the CPU 111 determines whether the pair of the authentication ID and the password input to the forms on the authentication screen matches a pair of a user identifier (authentication ID) 501 and a password 503 registered in the authentication table 500.

If the pair of the authentication ID and the password input to the forms on the authentication screen matches a pair of a user identifier (authentication ID) 501 and a password 503 registered in the authentication table 500, the user is successfully authenticated. If, on the other hand, the pair of the authentication ID and the password input to the forms on the authentication screen does not match a pair of a user identifier (authentication ID) 501 and a password 503 registered in the authentication table 500, the authentication of the user is failed.

In the first exemplary embodiment, setting information of a job received from a user having logged into a job processing apparatus is stored in a storage unit in association with identification information of the user. Then, according to the fact that the user logs out of the job processing apparatus and then logs into the job processing apparatus again, a selection screen for allowing the user to select whether to set as setting information of the job the setting information stored in the storage unit in association with the identification information of the user is displayed. Based on the fact that a selection is made through the selection screen to set as setting information of the job the setting information stored in association with the identification information of the user having logged into the job processing apparatus again, the setting information stored in association with the identification information of the user is set as setting information of the job. On the other hand, based on the fact that a selection is made through the selection screen so as not to set as setting information of the job the setting information stored in the storage unit in association with the identification information of the user having logged into the job processing apparatus again, default setting information is set as setting information of the job. The details are described below.

Figure 6B:
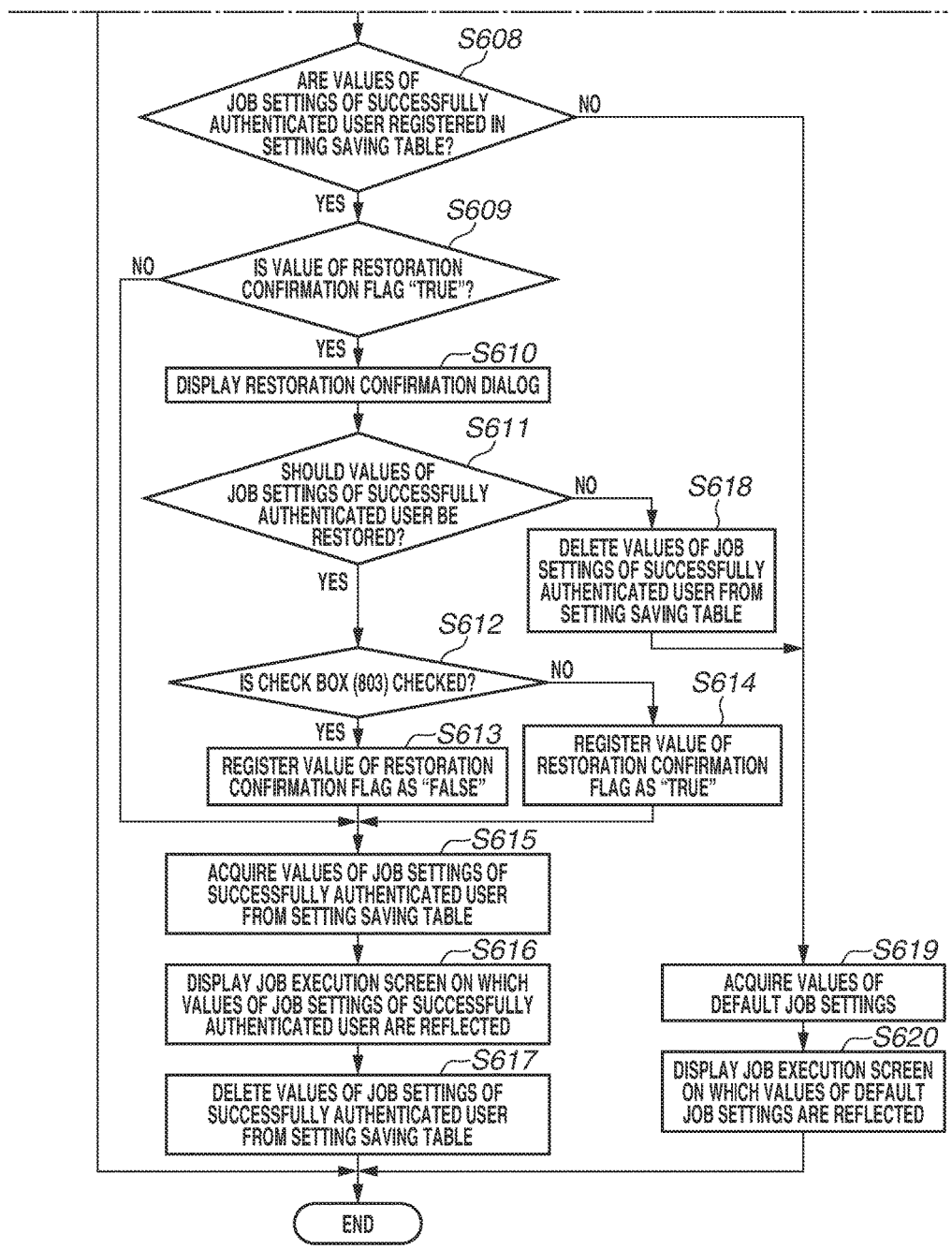
FIG. 6 (FIGS. 6A and 6B) is a flowchart illustrating an example of control according to the first exemplary embodiment.

With reference to a flowchart illustrated in FIGS. 6A and 6B, a description is given of a series of processes in which in the MFP 103 according to the first exemplary embodiment, a user logs into the MFP 103, and a job execution screen is displayed on the display 119. This processing is performed by the CPU 111 executing a control program read from the ROM 113 or the storage device 120 and loaded into the RAM 112.

First, in step S601, the CPU 111 determines whether the key (the authentication key) for calling the authentication screen is pressed. If it is determined that the authentication key is pressed (step S601: Yes), then in step S602, the CPU 111 displays the authentication screen on the display 119. If, on the other hand, it is determined that the authentication key is not pressed (step S601: No), the process of step S601 is repeated until the authentication key is pressed.

Next, in step S603, the CPU 111 receives the input of an authentication ID and a password through the authentication screen.

Next, in step S604, the CPU 111 references the authentication table 500 stored in the storage device 120. Then, in step S604, the CPU 111 compares the pair of the input authentication ID and the input password with a pair of an authentication ID (501) and a password (503) registered in the authentication table 500.

Next, in step S605, based on the result of the comparison made in step S604, the CPU 111 determines whether a user is successfully authenticated. If the pair of the input authentication ID and the input password matches a pair of an authentication ID (501) and a password (503) registered in the authentication table 500, the CPU 111 determines that a user is successfully authenticated. If, on the other hand, the pair of the input authentication ID and the input password does not match a pair of an authentication ID (501) and a password (503) registered in the authentication table 500, the CPU 111 determines that a user is not successfully authenticated.

If it is determined that a user is not successfully authenticated (step S605: No), then in step S621, the CPU 111 notifies the user that the authentication is failed. In this case, the user of which the authentication is failed is not permitted to use the MFP 103. In a variation, even the user of which the authentication is failed may be allowed to use as a guest user the MFP 103 on which only settings shared in the device are reflected (the MFP 103 having limited functions). The notification that the authentication is failed may be given by displaying a message on the display 119. Alternatively, the notification that the authentication is failed may be given by sound or light. After the process of step S621 is executed, the series of processes regarding FIGS. 6A and 6B ends.

If, on the other hand, it is determined that a user is successfully authenticated (step S605: Yes), then in step S606, the CPU 111 changes the status of the user successfully authenticated in step S605 from a "logout state" to a "login state".

Next, in step S607, the CPU 111 references a setting saving table 700, which is illustrated in FIG. 7. The setting saving table 700 is stored in the storage device 120.

As illustrated in FIG. 7, the setting saving table 700 is a table in which an authentication ID 701, job settings 702, a restoration confirmation flag 703, and a saving confirmation flag 704 are registered with respect to each user.

As the authentication ID 701, the user identifier (authentication ID) 501 is registered.

As the job settings 702, setting information of a job (e.g., copy job settings changed from default settings, or scan transmission job settings changed from default settings) is registered. As the initial value of the job settings 702, "null" is registered.

The restoration confirmation flag 703 is a flag for setting whether to display on the display 119 a restoration confirmation dialog 800, which will be described below with reference to FIG. 8. The restoration confirmation dialog 800 is a screen for causing the user to confirm whether to restore (import) at the time of the login the job settings saved at the time of the logout (i.e., the values of the job settings 702 registered in the setting saving table 700). If the value of the restoration confirmation flag 703 is "true", the restoration confirmation dialog 800 is displayed on the display 119 when the user logs into the MFP 103 again. If, on the other hand, the value of the restoration confirmation flag 703 is "false", the restoration confirmation dialog 800 is not displayed on the display 119 when the user logs into the MFP 103 again.

The saving confirmation flag 704 is a flag for setting whether to display on the display 119 a saving confirmation dialog 1000, which will be described below with reference to FIG. 10. The saving confirmation dialog 1000 is a screen for causing the user to confirm whether to save (i.e., register in the setting saving table 700) the values of the job settings (e.g., copy job settings changed from default settings) at the time of the logout. If the value of the saving confirmation flag 704 is "true", the saving confirmation dialog 1000 is displayed on the display 119 when the user logs out of the MFP 103. If, on the other hand, the value of the saving confirmation flag 704 is "false", the saving confirmation dialog 1000 is not displayed on the display 119 when the user logs out of the MFP 103.

The description returns to the processes of step S607 and thereafter.

In step S607, the CPU 111 references the setting saving table 700, and then, the processing proceeds to step S608. In step S608, based on the result of referencing the setting saving table 700, the CPU 111 determines whether the values of the job settings 702 of the successfully authenticated user are registered in the setting saving table 700. If it is determined that the values of the job settings 702 of the successfully authenticated user are registered in the setting saving table 700 (step S608: Yes), the processing proceeds to step S609. If, on the other hand, it is determined that the values of the job settings 702 of the successfully authenticated user are not registered in the setting saving table 700 (step S608: No), the processing proceeds to step S619. The details of the process of step S619 will be described below.

In an example of FIG. 7, for a user of which the authentication ID is "00000002", "the number of copies: 10, color selection: monochrome, magnification: 100%, sheet selection: automatic sheet, finishing: stapling, two-sided copying: two-sided→two-sided, density: standard density, and document type: text/photograph, . . . " are registered. Thus, if the authentication ID of the successfully authenticated user is "00000002", it is determined that the values of the job settings 702 of the successfully authenticated user are registered in the setting saving table 700 (step S608: Yes). On the other hand, for a user of which the authentication ID is "00010001", the values of the job settings 702 are not registered (the values of the job settings 702 are "null"). Thus, if the authentication ID of the successfully authenticated user is "00010001", it is determined that the values of the job settings 702 of the successfully authenticated user are not registered in the setting saving table 700 (step S608: No).

Next, in step S609, the CPU 111 determines whether the value of the restoration confirmation flag 703 registered in the setting saving table 700 is "true". If it is determined that the value of the restoration confirmation flag 703 is "true" (step S609: Yes), the processing proceeds to step S610. If, on the other hand, it is determined that the value of the restoration confirmation flag 703 is "false" (step S609: No), the processing proceeds to step S615.

Figure 8:
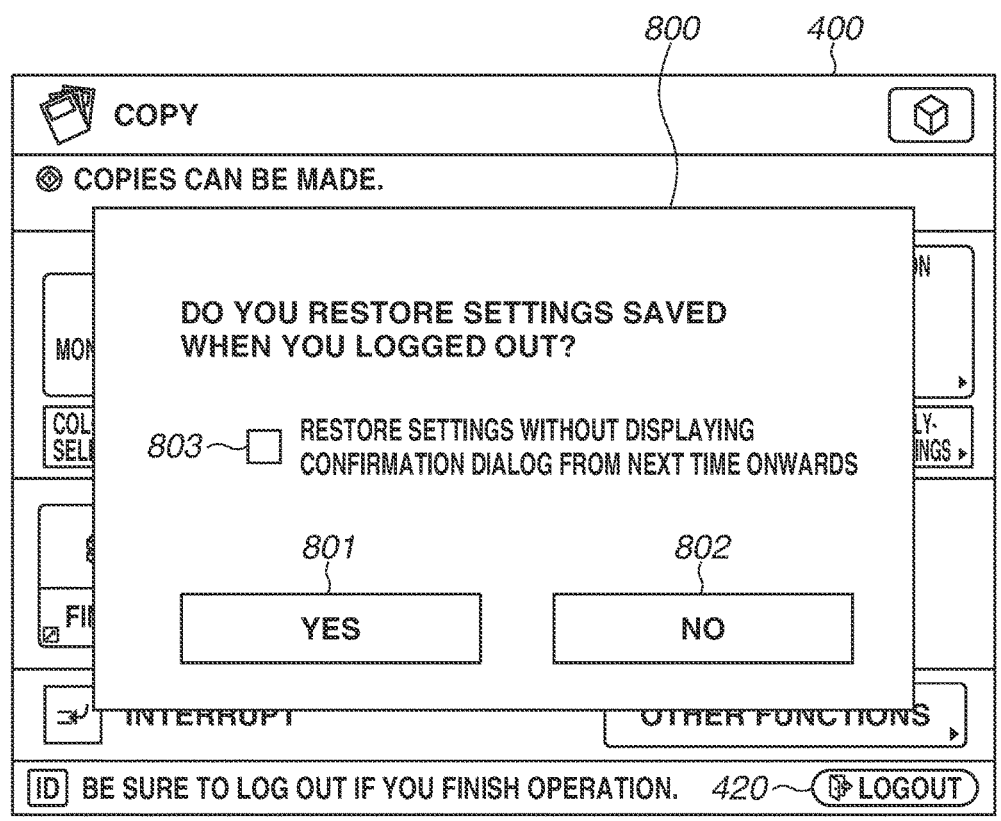
FIG. 8 is a diagram illustrating a configuration of a screen according to the first exemplary embodiment.

Next, in step S610, the CPU 111 displays on the display 119 the restoration confirmation dialog 800, which is illustrated in FIG. 8. The user having logged into the MFP 103 again views the restoration confirmation dialog 800 displayed on the display 119 and thereby can determine whether to restore the job settings saved at the time of the logout (i.e., the values of the job settings 702 registered in the setting saving table 700). If a check box 803 in the restoration confirmation dialog 800 is checked by the user, a button 802 in the restoration confirmation dialog 800 is grayed out for a restriction so that the user cannot press the button 802. An example has been illustrated where as illustrated in FIG. 8, the CPU 111 displays the restoration confirmation dialog 800 on the copy execution screen 400 in a superimposed manner. The present invention, however, is not limited to this. In a variation, the CPU 111 may display the restoration confirmation dialog 800 in the entire area of the display 119.

Next, in step S611, the CPU 111 determines whether the values of the job settings of the successfully authenticated user should be restored. If a button 801 in the restoration confirmation dialog 800 is pressed by the user, the CPU 111 determines that the values of the job settings of the successfully authenticated user should be restored (step S611: Yes). If, on the other hand, the button 802 in the restoration confirmation dialog 800 is pressed by the user, the CPU 111 determines that the values of the job settings of the successfully authenticated user should not be restored (step S611: No). If it is determined that the values of the job settings of the successfully authenticated user should be restored (step S611: Yes), the processing proceeds to step S612. If, on the other hand, it is determined that the values of the job settings of the successfully authenticated user should not be restored (step S611: No), the processing proceeds to step S618. The details of the process of step S618 will be described below.

In step S612, the CPU 111 determines whether the check box 803 in the restoration confirmation dialog 800 is checked. If it is determined that the check box 803 is checked (step S612: Yes), then in step S613, the CPU 111 registers the value of the restoration confirmation flag 703 as "false" in the setting saving table 700. If, on the other hand, it is determined that the check box 803 is not checked (step S612: No), then in step S614, the CPU 111 registers the value of the restoration confirmation flag 703 as "true" in the setting saving table 700. In a variation in which the check box 803 is not included in the restoration confirmation dialog 800 displayed on the display 119, the processes of steps S612 to S614 may be omitted, and after the determination is Yes in step S611, the processing may proceed to step S615.

Next, in step S615, the CPU 111 acquires the values of the job settings 702 of the successfully authenticated user from the setting saving table 700. For example, if the authentication ID of the successfully authenticated user is "00000002", XML data describing "the number of copies: 10, color selection: monochrome, magnification: 100%, sheet selection: automatic sheet, finishing: stapling, . . . " is imported as the values of the job settings 702.

Next, in step S616, based on the values of the job settings 702 acquired in step S615, the CPU 111 displays on the display 119 a job execution screen on which the values of the job settings 702 of the successfully authenticated user are reflected. For example, if the authentication ID of the successfully authenticated user is "00000002", the copy execution screen 410 illustrated in FIG. 4B on which the values of the job settings "the number of copies: 10, color selection: monochrome, magnification: 100%, . . . " are reflected is displayed on the display 119.

Next, in step S617, the CPU 111 deletes the values of the job settings 702 of the successfully authenticated user from the setting saving table 700. If the values of the job settings 702 of the successfully authenticated user are deleted from the setting saving table 700, the values of the job settings 702 become "null". Then, after the process of step S617, the series of processes regarding FIGS. 6A and 6B ends.

Next, the processes of steps S618 to S620 are described.

In step S618, the CPU 111 deletes the values of the job settings 702 of the successfully authenticated user from the setting saving table 700. If the values of the job settings 702 of the successfully authenticated user are deleted from the setting saving table 700, the values of the job settings 702 become "null".

Next, in step S619, the CPU 111 acquires the values of default job settings from the storage device 120. For example, XML data describing "the number of copies: 1, color selection: monochrome, magnification: 100%, sheet selection: automatic sheet, density: standard density, document type: text/photograph, . . . " is imported as the values of the default job settings. The values of the default job settings may be device settings, individual settings, or group settings. These settings may be registered in the setting saving table 700 with respect to each user.

Next, in step S620, based on the values of the job settings acquired in step S619, the CPU 111 displays on the display 119 a job execution screen on which the values of the default job settings are reflected. For example, the copy execution screen 400 illustrated in FIG. 4A on which the values of the default job settings "the number of copies: 1, color selection: monochrome, magnification: 100%, sheet selection: automatic sheet, density: standard density, document type: text/photograph, . . . " are reflected is displayed on the display 119. An example has been described where in step S620, the CPU 111 displays on the display 119 a job execution screen on which the values of the default job settings are reflected. The present invention, however, is not limited to this. In a variation, in step S620, the CPU 111 may display on the display 119 the main screen on which the buttons for calling the various functions such as the copy function, the fax function, the scan transmission function, and the print function are displayed, instead of the copy execution screen 400. The main screen refers to a function selection screen for allowing the user to select any one of the various functions such as the copy function, the fax function, the scan transmission function, and the print function, as the function of a job to be executed by the MFP 103. Then, after the process of step S620, the series of processes regarding FIGS. 6A and 6B ends.

This is the details of the series of processes in which in the MFP 103 according to the first exemplary embodiment, a user logs into the MFP 103, and a job execution screen is displayed on the display 119.

Figure 9:
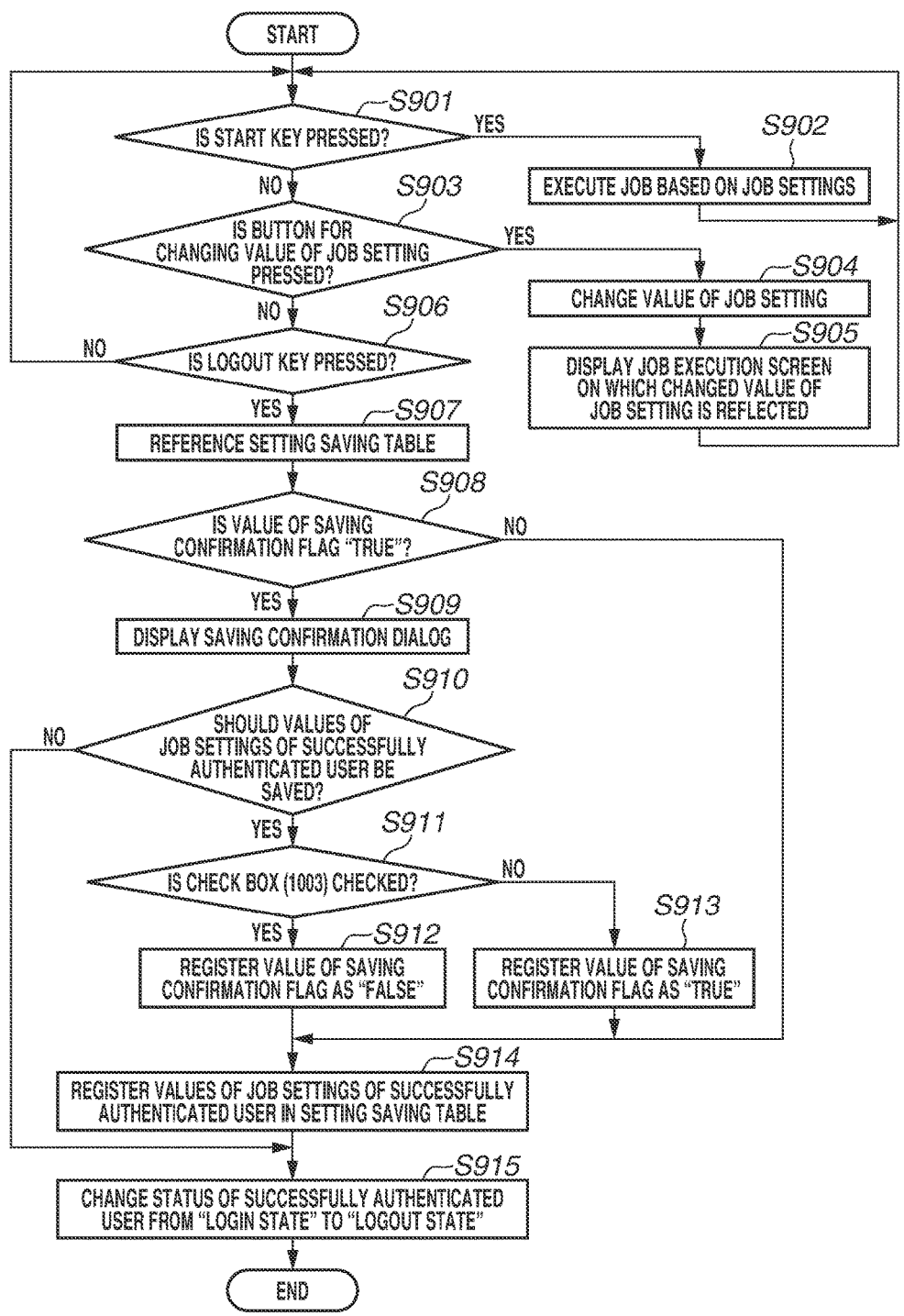
FIG. 9 is a flowchart illustrating an example of control according to the first exemplary embodiment.

Next, with reference to a flowchart illustrated in FIG. 9, a description is given of a series of processes in which in the MFP 103 according to the first exemplary embodiment, a user having logged in the MFP 103 logs out of the MFP 103. This processing is performed by the CPU 111 executing a control program read from the ROM 113 or the storage device 120 and loaded into the RAM 112. The processing in FIG. 9 is executed after the processing described in FIG. 6B (step S617 or step S620), and is started in the state where the job execution screen is displayed on the display 119. For example, when the processing in FIG. 9 is started, the copy execution screen 400 illustrated in FIG. 4A is displayed on the display 119.

First, in step S901, the CPU 111 determines whether the start key is pressed. If it is determined that the start key is pressed (step S901: Yes), then in step S902, the CPU 111 executes the job based on the job settings. Then, the processing returns to step S901. If, on the other hand, it is determined that the start key is not pressed (step S901: No), the processing proceeds to step S903.

In step S903, the CPU 111 determines whether a button for changing the value of a job setting (e.g., the sheet selection button 404 or the finishing button 405 illustrated in FIG. 4A) is pressed. If it is determined that a button for changing the value of a job setting is pressed (step S903: Yes), then in step S904, the CPU 111 changes the value of the job setting. Also if the key for transitioning from the job execution screen for each function to the main screen is pressed by the user, the CPU 111 determines that a button for changing the value of a job setting is pressed (step S903: Yes). Next, in step S905, the CPU 111 displays on the display 119 a job execution screen on which the value of the job setting changed in step S904 is reflected. For example, in the process of step S905, the copy execution screen 410 illustrated in FIG. 4B is displayed on the display 119. If the key for transitioning from the job execution screen for each function to the main screen is pressed by the user, then in step S905, the CPU 111 displays on the display 119 the main screen on which the buttons for calling the various functions are displayed.

If, on the other hand, it is determined that a button for changing the value of a job setting is not pressed (step S903: No), the processing proceeds to step S906. In step S906, the CPU 111 determines whether the logout key is pressed. For example, if a logout key 420 on the copy execution screen 400 illustrated in FIG. 4A or a logout key 420 on the copy execution screen 410 illustrated in FIG. 4B is pressed by the user, the CPU 111 determines that the logout key is pressed.

If it is determined that the logout key is pressed (step S906: Yes), the processing proceeds to step S907. If, on the other hand, it is determined that the logout key 420 is not pressed (step S906: No), the processing returns to step S901.

Next, the processes of step S907 and thereafter are described.

In step S907, the CPU 111 references the setting saving table 700 illustrated in FIG. 7.

Next, in step S908, the CPU 111 determines whether the value of the saving confirmation flag 704 registered in the setting saving table 700 is "true". If it is determined that the value of the saving confirmation flag 704 is "true" (step S908: Yes), the processing proceeds to step S909. If, on the other hand, it is determined that the value of the saving confirmation flag 704 is "false" (step S908: No), the processing proceeds to step S914. The details of the process of step S914 will be described below.

Figure 10:
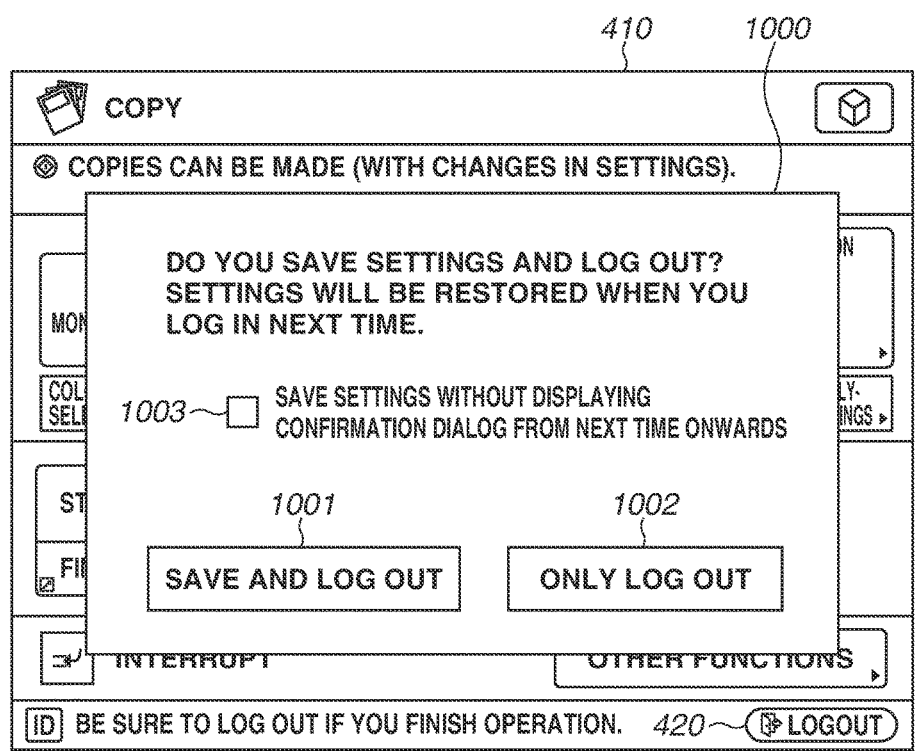
FIG. 10 is a diagram illustrating a configuration of a screen according to the first exemplary embodiment.

Next, in step S909, the CPU 111 displays on the display 119 the saving confirmation dialog 1000, which is illustrated in FIG. 10. The saving confirmation dialog 1000 refers to a storage selection screen for allowing the user to select whether to store setting information of a job received from the user having logged in the MFP 103, in the storage device 120 in association with identification information of the user. The user attempting to log out of the MFP 103 views the saving confirmation dialog 1000 displayed on the display 119 and thereby can determine whether to save (register in the setting saving table 700) the job setting (e.g., the value of the job setting changed in step S905) at the time of the logout. If a check box 1003 in the saving confirmation dialog 1000 is checked by the user, a button 1002 in the saving confirmation dialog 1000 is grayed out for a restriction so that the user cannot press the button 1002. An example has been illustrated where as illustrated in FIG. 10, the CPU 111 displays the saving confirmation dialog 1000 on the copy execution screen 410 in a superimposed manner. The present invention, however, is not limited to this. In a variation, the CPU 111 may display the saving confirmation dialog 1000 in the entire area of the display 119.

Next, in step S910, the CPU 111 determines whether the values of the job settings of the successfully authenticated user should be saved. If a button 1001 in the saving confirmation dialog 1000 is pressed by the user, the CPU 111 determines that the values of the job settings of the successfully authenticated user should be saved (step S910: Yes). If, on the other hand, the button 1002 in the saving confirmation dialog 1000 is pressed by the user, the CPU 111 determines that the values of the job settings of the successfully authenticated user should not be saved (step S910: No). If it is determined that the values of the job settings of the successfully authenticated user should be saved (step S910: Yes), the processing proceeds to step S911. If, on the other hand, it is determined that the values of the job settings of the successfully authenticated user should not be saved (step S910: No), the processing proceeds to step S915. The details of the process of step S915 will be described below.

Next, in step S911, the CPU 111 determines whether the check box 1003 in the saving confirmation dialog 1000 illustrated in FIG. 10 is checked. If it is determined that the check box 1003 is checked (step S911: Yes), then in step S912, the CPU 111 registers the value of the saving confirmation flag 704 as "false" in the setting saving table 700. Then, the processing proceeds to step S914. If, on the other hand, it is determined that the check box 1003 is not checked (step S911: No), then in step S913, the CPU 111 registers the value of the saving confirmation flag 704 as "true" in the setting saving table 700. Then, the processing proceeds to step S914. In a variation in which the check box 1003 is not included in the saving confirmation dialog 1000 displayed on the display 119, the processes of steps S911 to S913 may be omitted, and after the determination is Yes in step S910, the processing may proceed to step S914. Next, in step S914, the CPU 111 registers the values of the job settings of the successfully authenticated user in the setting saving table 700.

Next, in step S915, the CPU 111 changes the status of the successfully authenticated user from a "login state" to a "logout state". Then, after the process of step S915, the series of processes regarding FIG. 9 ends.

This is the details of the series of processes in which in the MFP 103 according to the first exemplary embodiment, a user having logged in the MFP 103 logs out of the MFP 103.

In the first exemplary embodiment, through a screen displayed according to the fact that a user logs in again, the user can select whether to set setting information of a job received from the user at the time of the previous login, as setting information of the job when the user logs in again. For example, suppose that a user having logged in a job processing apparatus needs to leave the job processing apparatus while setting a job. In this case, the user logs out of the job processing apparatus. In the case of such a user, through a screen displayed according to the fact that the user logs into the job processing apparatus again, the user may make a selection to set setting information of the job received from the user at the time of the previous login, as setting information of the job when the user logs into the job processing apparatus again. That is, the invention according to the first exemplary embodiment is applied, whereby, when a user logs in again, the user can take over the settings of a job that the user has made at the time of the previous login, and continue to set the job. Further, for example, suppose that after a user having logged in a job processing apparatus sets a job, the need to execute the job is eliminated. In this case, the user logs out of the job processing apparatus. In the case of such a user, through a screen displayed according to the fact that the user logs into the job processing apparatus again, the user may make a selection so as not to set setting information of the job received from the user at the time of the previous login, as setting information of the job when the user logs into the job processing apparatus again. That is, the invention according to the first exemplary embodiment is applied, whereby, when a user logs in again, the user can set a job from the beginning without taking over the settings of a job that the user has made at the time of the previous login. In the first exemplary embodiment, the following variation may be applied. That is, the CPU 111 registers, in the setting saving table 700, information of the screen displayed on the display 119 when the user logs out of the MFP 103 (referred to as "captured screen information"). Then, when the user logs into the MFP 103 again, the CPU 111 acquires the captured screen information from the setting saving table 700. Then, based on the acquired captured screen information, when the user logs into the MFP 103 again, the CPU 111 displays on the display 119 the same screen as that displayed on the display 119 when the user has previously logged out of the MFP 103. Such a variation is applied, whereby, when a user logs in again, it is possible to not only restore the values of the job settings made when the user has previously logged out, but also display the screen displayed on the display 119 when the user has previously logged out.

In the first exemplary embodiment, an example has been described where, if the value of the saving confirmation flag 704 is "true" when the user logs out of the MFP 103, the saving confirmation dialog 1000 is displayed on the display 119.

If, on the other hand, the values of the job settings are not changed from the default values in the first place when the user logs out of the MFP 103, the values of the job settings of the successfully authenticated user do not need to be registered in the setting saving table 700. This is because even if the values of the job settings of the successfully authenticated user are not registered in the setting saving table 700, and when the user logs into the MFP 103 again, a job execution screen on which the values of the default job settings are reflected can be displayed on the display 119.

In response, in the second exemplary embodiment, an example is described where in a case where the values of the job settings of the successfully authenticated user do not need to be registered in the setting saving table 700, the saving confirmation dialog 1000 is not displayed on the display 119, regardless of the value of the saving confirmation flag 704. The case where the values of the job settings of the successfully authenticated user do not need to be registered in the setting saving table 700 is, for example, a case where the values of the job settings are not changed from the default values.

In the MFP 103 according to the second exemplary embodiment, a part of the processing of the flowchart described in FIG. 9 differs. In response, the processes different from those in the first exemplary embodiment are mainly described with reference to FIGS. 11A and 11B. The processes similar to those in the first exemplary embodiment are designated by the same step numbers, and are not described in detail here.

If it is determined that the logout key is pressed (step S906: Yes), the processing proceeds to step S1101 in FIG. 11B.

In step S1101, the CPU 111 determines whether the function corresponding to the screen currently displayed on the display 119 is a target function for which the values of the job settings are to be registered in the setting saving table 700. For example, the copy function, the fax function, and the scan transmission function may be determined as target functions for which the values of the job settings are to be registered in the setting saving table 700. However, the print function may not be determined as a target function for which the values of the job settings are to be registered in the setting saving table 700. As described above, the administrator of the device may be able to set, or each individual user may be able to set, with respect to each function, whether the function is a target function for which the values of the job settings are to be registered in the setting saving table 700.

If it is determined that the function corresponding to the screen currently displayed on the display 119 is a target function for which the values of the job settings are to be registered in the setting saving table 700 (step S1101: Yes), the processing proceeds to step S1102. If, on the other hand, it is determined that the function corresponding to the screen currently displayed on the display 119 is not a target function for which the values of the job settings are to be registered in the setting saving table 700 (step S1101: No), the processing proceeds to step S915.

Next, in step S1102, the CPU 111 determines whether the screen currently displayed on the display 119 is a target screen for which captured screen information is to be registered in the setting saving table 700. For example, if the scan transmission function is called, a setting screen for the transmission function may be determined as a target screen, but an editing screen for the transmission destination may not be determined as a target screen. Further, for example, if a screen capable of receiving setting information of a job from the user through the numeric keypad (e.g., a standby screen on which the execution of a job is started by pressing the start key) is displayed on the display 119, this screen may be determined as a target screen. If, on the other hand, a screen incapable of receiving setting information of a job from the user (e.g., a screen for displaying a list of jobs, or a screen for displaying the error status of a job) is displayed on the display 119, this screen may not be determined as a target screen. Further, for example, a screen waiting for the execution of a job may be determined as a target screen, but a screen during the execution of a job may not be determined as a target screen. As described above, the administrator of the device may be able to set, or each individual user may be able to set, with respect to each function screen, whether the function screen is a target screen for which captured screen information is to be registered in the setting saving table 700.

If it is determined that the screen currently displayed on the display 119 is a target screen for which captured screen information is to be registered in the setting saving table 700 (step S1102: Yes), the processing proceeds to step S1103. If, on the other hand, it is determined that the screen currently displayed on the display 119 is not a target screen for which captured screen information is to be registered in the setting saving table 700 (step S1102: No), the processing proceeds to step S915.

In step S1103, the CPU 111 determines whether the values of the job settings are changed. For example, if the values of the job settings are not changed from the default values, the values of the job settings do not need to be registered in the setting saving table 700. This is because if the values of the job settings are not changed from the default values, and even if the values of the job settings are not registered in the setting saving table 700, the values of the default job settings can be imported when the user logs into the MFP 103 again.

If it is determined that the values of the job settings are changed from the default values (step S1103: Yes), the processing proceeds to step S907. If, on the other hand, it is determined that the values of the job settings are not changed from the default values (step S1103: No), the processing proceeds to step S915.

This is the details of the processes different from those in the first exemplary embodiment, in the processing of the flowchart described in FIGS. 11A and 11B in the MFP 103 according to the second exemplary embodiment. It is not essential to execute all the processes of steps S1101, S1102, and S1103. Based on the settings of the administrator of the device or the settings of an individual user, any combination of these processes may be executed.

As described above, in the second exemplary embodiment, an example has been described where in a case where the values of the job settings of the successfully authenticated user do not need to be registered in the setting saving table 700, the saving confirmation dialog 1000 is not displayed on the display 119, regardless of the value of the saving confirmation flag 704. Consequently, in a case where the values of the job settings of the successfully authenticated user do not need to be registered in the setting saving table 700, the user can omit to confirm the saving confirmation dialog 1000 displayed on the display 119.

Other Exemplary Embodiments

The present invention is not limited to the above exemplary embodiments. Various modifications (including the organic combinations of the exemplary embodiments) can be made based on the spirit of the present invention, but are not excluded from the scope of the present invention.

For example, in the present exemplary embodiments, the CPU 111 of the controller unit 100 of the MFP 103 performs the above various types of control. The present invention, however, is not limited to this. Alternatively, a print control apparatus such as an external controller having a housing separate from the MFP 103 may be configured to perform some or all of the above various types of control.

According to the present invention, through a screen displayed according to the fact that a user logs in again, the user can select whether to set setting information of a job received from the user at the time of the previous login, as setting information of the job when the user logs in again.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-184525, filed Sep. 17, 2015, which is hereby incorporated by reference herein in its entirety.

What is claimed is:

1. A job processing apparatus comprising:
a storage unit;
an authentication unit configured to authenticate a user;
a memory storing instructions; and
one or more processors which execute the instructions and cause the job processing apparatus to function as:
a login processing unit configured to perform a login process for causing the user authenticated by the authentication unit to log into the job processing apparatus;
a storage control unit configured to store setting information of a job received from the user authenticated by the authentication unit, in association with identification information of the user;
a logout processing unit configured to perform a logout process for causing the user caused to log into the job processing apparatus by the login processing unit to log out of the job processing apparatus; and
a display control unit configured to, according to that the user caused to log out of the job processing apparatus by the logout processing unit is caused to log into the job processing apparatus again by the login processing unit, display a dialog for confirming whether to restore the setting information received from the user, and display a screen on which the setting information stored by the storage control unit is reflected based on an instruction to restore the setting information.

2. The job processing apparatus according to claim 1, wherein the display control unit displays a default setting screen based on an instruction to not restore the setting information.

3. The job processing apparatus according to claim 1, further comprising an execution unit configured to execute a job based on the setting information reflected on the displayed screen.

4. The job processing apparatus according to claim 1, wherein based on a fact that the user having logged into the job processing apparatus logs out of the job processing apparatus, the storage control unit stores the setting information of the job received from the user in association with the identification information of the user.

5. A control method for controlling a job processing apparatus, the control method comprising:
authenticating a user;
causing the authenticated user to log into the job processing apparatus;
storing setting information of a job received from the authenticated user, in a storage unit in association with identification information of the user;
causing the user caused to log into the job processing apparatus to log out of the job processing apparatus; and
according to a fact that the user caused to log out of the job processing apparatus is caused to log into the job processing apparatus again, displaying a dialog for confirming whether to restore the setting information received from the user, and displaying a screen on which the stored setting information is reflected based on an instruction to restore the setting information.

6. A storage medium having stored thereon a computer program for causing a computer to execute a control method for controlling a job processing apparatus, the control method comprising:
authenticating a user;
causing the authenticated user to log into the job processing apparatus;
storing setting information of a job received from the authenticated user, in a storage unit in association with identification information of the user;
causing the user caused to log into the job processing apparatus to log out of the job processing apparatus; and
according to a fact that the user caused to log out of the job processing apparatus is caused to log into the job processing apparatus again, displaying a dialog for confirming whether to restore the setting information received from the user, and displaying a screen on which the stored setting information is reflected based on an instruction to restore the setting information.

7. A job processing apparatus comprising:
a storage unit;
an authentication unit configured to authenticate a user;
a memory storing instructions; and
one or more processors which execute the instructions and cause the job processing apparatus to function as:
- a login processing unit configured to perform a login process for causing the user authenticated by the authentication unit to log into the job processing apparatus;
- a storage control unit configured to display a dialog for confirming whether to keep setting information of a job received from the authenticated user stored in association with identification information of the user even after the user is caused to log out of the job processing apparatus based on an instruction to cause the user to log out of the job processing apparatus, and store the setting information based on an instruction to keep the setting information stored;
- a logout processing unit configured to perform a logout process for causing the user caused to log into the job processing apparatus by the login processing unit to log out of the job processing apparatus based on an instruction to cause the user to log out of the processing apparatus; and
- a display control unit configured to display a screen on which the stored setting information is reflected according to the user caused to log out of the job processing apparatus by the logout processing unit being caused to log into the job processing apparatus again by the login processing unit.

8. The job processing apparatus according to claim 7, wherein the display control unit displays a dialog for confirming whether to restore the setting information received from the user, according to the user caused to log out of the job processing apparatus by the logout processing unit being caused to log into the job processing apparatus again by the login processing unit, and displays a screen on which the stored setting information is reflected based on an instruction to restore the setting information.

9. The job processing apparatus according to claim 8, wherein the display control unit displays a screen on which default setting information is reflected based on an instruction to not restore the setting information.

10. A control method for controlling a job processing apparatus, the control method comprising:
- authenticating a user;
- causing the authenticated user to log into the job processing apparatus;
- displaying a dialog for confirming whether to keep setting information of a job received from the authenticated user stored in association with identification information of the user even after the user is caused to log out of the job processing apparatus based on an instruction to cause the user to log out of the job processing apparatus, and storing the setting information based on an instruction to keep the setting information stored;
- causing the user caused to log into the job processing apparatus to log out of the job processing apparatus based on an instruction to cause the user to log out of the processing apparatus; and
- displaying a screen on which the stored setting information is reflected according to the user caused to log out of the job processing apparatus being caused to log into the job processing apparatus again.

11. The control method according to claim 10, further comprising:
- displaying a dialog for confirming whether to restore the setting information received from the user, according to the user caused to log out of the job processing apparatus being caused to log into the job processing apparatus again; and
- displaying a screen on which the stored setting information is reflected based on an instruction to restore the setting information.

12. The control method according to claim 11, further comprising:
- displaying a screen on which default setting information is reflected based on an instruction to not restore the setting information.

* * * * *